United States Patent [19]

Gilmer

[11] Patent Number: 5,000,081

[45] Date of Patent: Mar. 19, 1991

[54] VENTILATION APPARATUS

[76] Inventor: Robert S. Gilmer, 328 Innsbruck Ct., Santa Rosa, Calif. 95401

[21] Appl. No.: 512,334

[22] Filed: Apr. 23, 1990

[51] Int. Cl.[5] ............................................. F24F 7/08
[52] U.S. Cl. ........................................... 98/35; 165/54
[58] Field of Search ...................... 98/33.1, 35, 40.07, 98/62; 165/54, 909

[56] References Cited

U.S. PATENT DOCUMENTS

| 1,529,711 | 3/1925 | Parrott et al. | 98/33.1 |
| 3,791,279 | 2/1974 | Holt et al. | 98/35 X |
| 4,336,748 | 6/1982 | Martin et al. | 98/35 X |
| 4,846,261 | 7/1989 | Kittilä | 98/33.1 X |

FOREIGN PATENT DOCUMENTS

| 29573 | 6/1981 | European Pat. Off. | 165/54 |
| 238631 | 11/1985 | Japan | 98/33.1 |

Primary Examiner—Harold Joyce
Attorney, Agent, or Firm—Leon Gilden

[57] ABSTRACT

An apparatus including a ventilation conduit mounted within a ceiling structure of a dwelling, with an exhaust fan and intake fan arranged at ninety degrees relative to one another, with an intake pipe and exhaust pipe arranged contiguously about their major extent relative to one another to effect heat exchange minimizing cold air entering the dwelling.

7 Claims, 5 Drawing Sheets

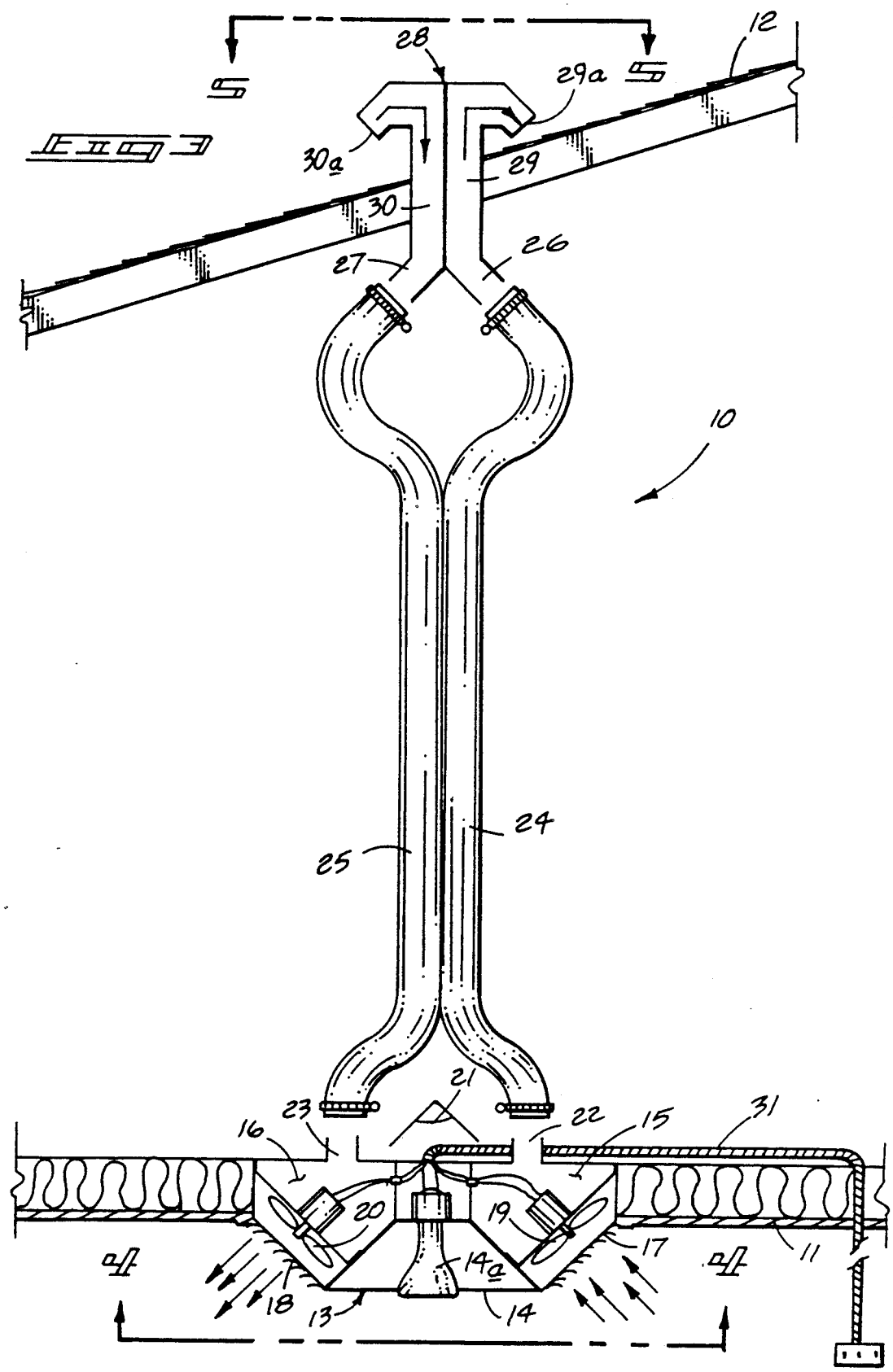

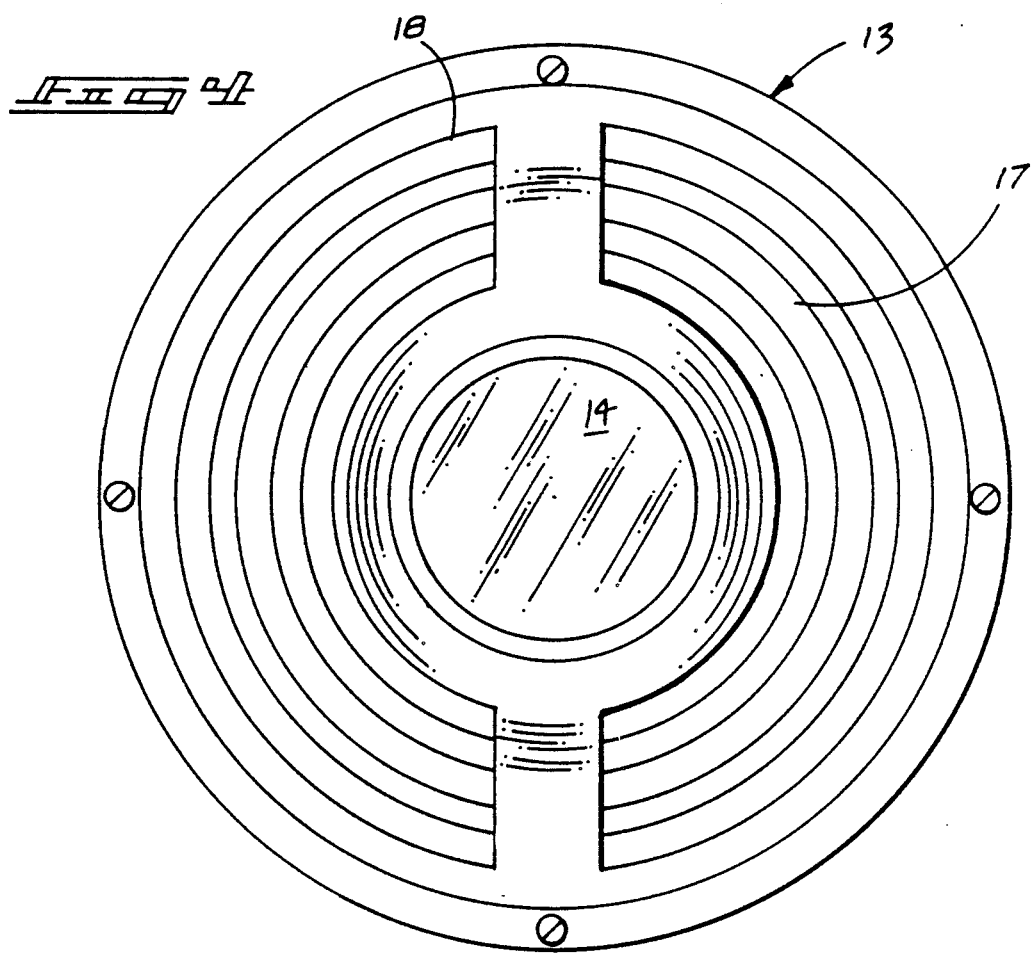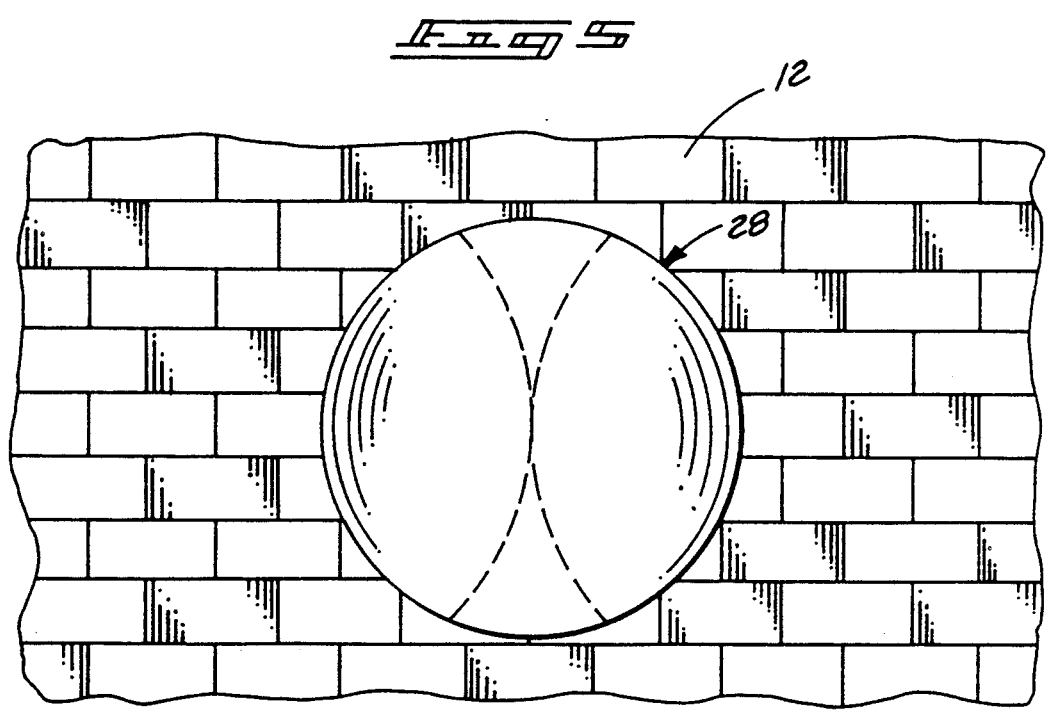

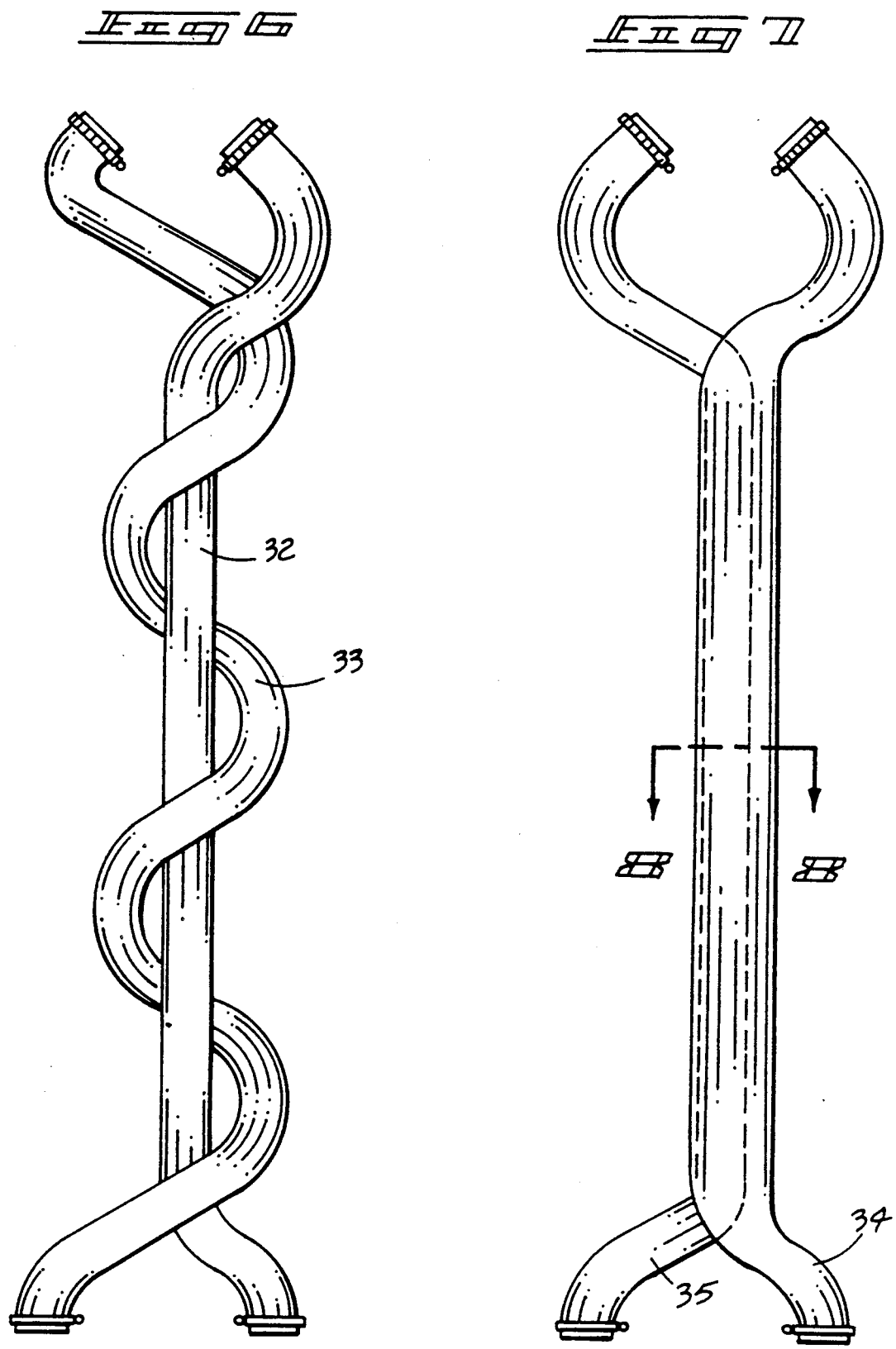

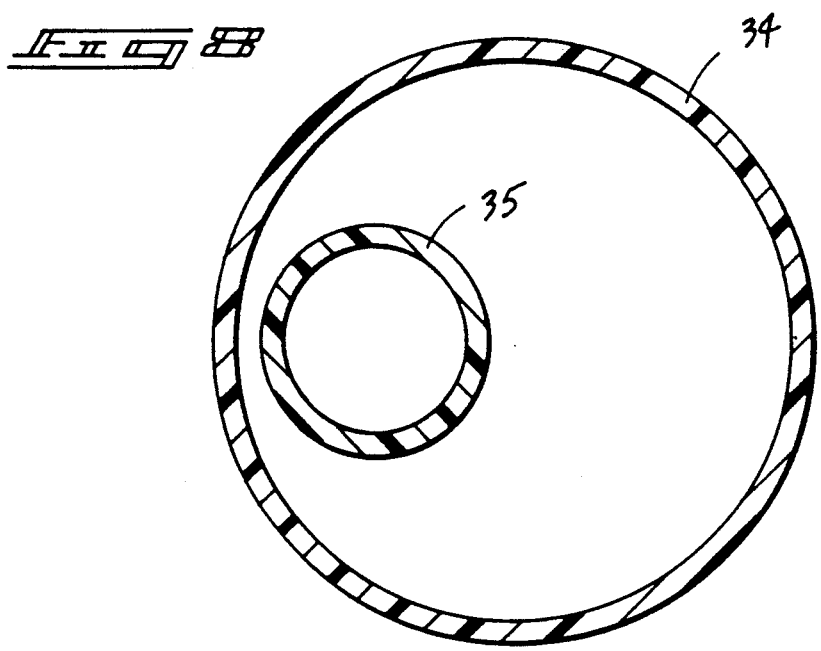
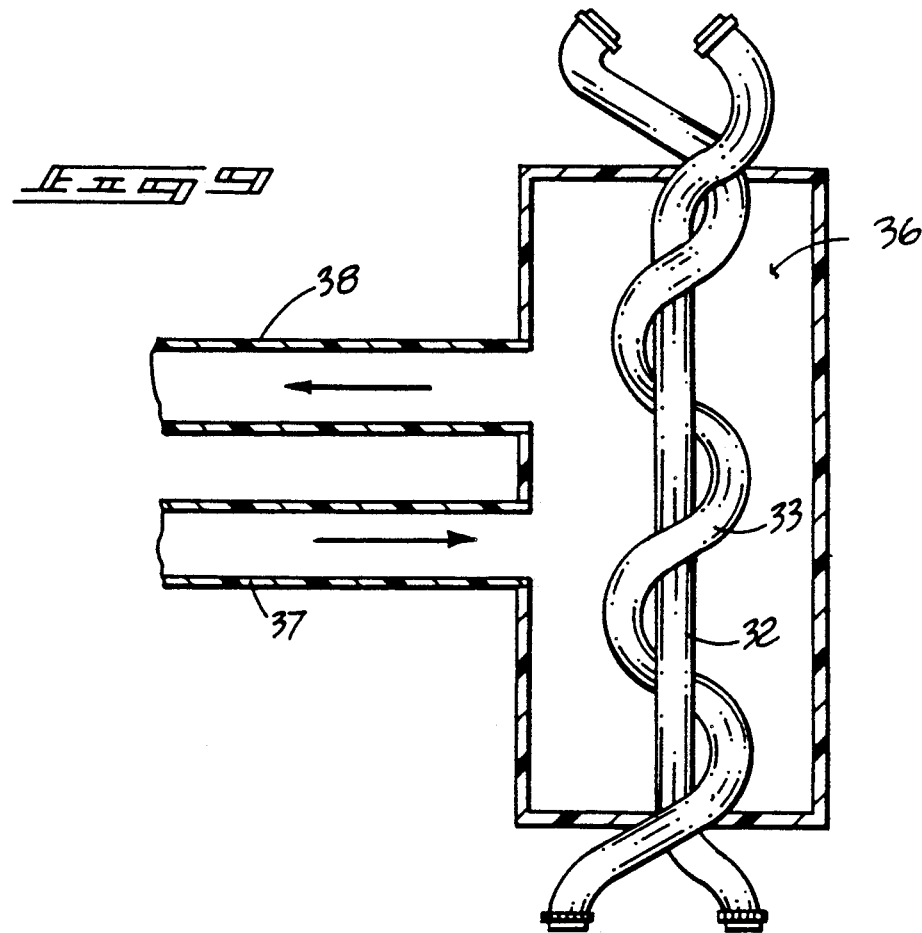

VENTILATION APPARATUS

BACKGROUND OF THE INVENTION

1. Field of the Invention

The field of invention relates to ventilation apparatus, and more particularly pertains to a new and improved ventilation apparatus wherein the same is arranged in a convenient modular ventilation unit mounted within a ceiling structure of a dwelling, with intake and exhaust pipes mounted relative to one another to effect heat exchange relative to one another.

2. Description of the Prior Art

Typically with intake air, the intake air is not subject to a heating prior to its introduction within an associated dwelling. To minimize costly effects of heating coils and the like directed about such intake air, the instant invention positions the cooperative intake and exhaust tubing in a contiguous relationship about a major extent of their length to elevate incoming air. Conversely, during periods of elevated temperatures exteriorly of a dwelling, the exhaust air helps cool the incoming charge of ventilation air. Examples of the prior art include U.S. Pat. No. 3,326,112 to Sadlow, et al. wherein exhaust air is directed past a lighting fixture to help cool the lighting fixture in use.

U.S. Pat. No. 3,693,530 to Larkfeldt, et al. sets forth a lighting fixture with exhaust air directed therethrough about the surface of the lens of the lighting fixture to cool the same, such exhaust air directed past the tubing of the light to effect cooling of the fixture.

U.S. Pat. No. 4,591,092 to Kolt provides an energy saver damper apparatus responsive to temperature utilizing flaps mounted within a ceiling structure of a dwelling to assist in directing air exteriorly of the dwelling through the roof structure.

U.S. Pat. No. 3,312,160 to Rackley sets forth an adjustable air flow damper in use with a lighting fixture to direct air and discourage foreign matter from entering the fixture.

U.S. Pat. No. 3,570,385 to Heisterkamp sets forth a ventilation system for a room which allows lighting fixtures to pass substantially the same volume of air per unit as other fixtures within the room.

As such, it may be appreciated that there continues to be a need for a new and improved ventilation apparatus wherein the same addresses both the problems of effectiveness and efficiency in directing and exchanging air from interiorly of a dwelling and to minimize heat loss from the dwelling in use.

SUMMARY OF THE INVENTION

In view of the foregoing disadvantages inherent in the known types of ventilation apparatus now present in the prior art, the present invention provides a ventilation apparatus wherein the same provides passage heat exchange of air from use of the organization to minimize heat loss from the dwelling. As such, the general purpose of the present invention, which will be described subsequently in greater detail, is to provide a new and improved ventilation apparatus which has all the advantages of the prior art ventilation apparatus and none of the disadvantages.

To attain this, the present invention provides an apparatus including a ventilation conduit mounted within a ceiling structure of a dwelling, with an exhaust fan and intake fan arranged at ninety degrees relative to one another, with an intake pipe and exhaust pipe arranged contiguously about their major extent relative to one another to effect heat exhange minimizing cold air entering the dwelling.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ventilation apparatus which has all the advantages of the prior art ventilation apparatus and none of the disadvantages.

It is another object of the present invention to provide a new and improved ventilation apparatus which may be easily and efficiently manufactured and marketed.

It is a further object of the present invention to provide a new and improved ventilation apparatus which is of a durable and reliable construction.

An even further object of the present invention is to provide a new and improved ventilation apparatus which is susceptible of a low cost of manufacture with regard to both materials and labor, and which accordingly is then susceptible of low prices of sale to the consuming public, thereby making such ventilation apparatus economically available to the buying public.

Still yet another object of the present invention is to provide a new and improved ventilation apparatus which provides in the apparatuses and methods of the prior art some of the advantages thereof, while simultaneously overcoming some of the disadvantages normally associated therewith.

Still another object of the present invention is to provide a new and improved ventilation apparatus wherein the same utilizes a unitary conveniently installed and modular ventilation housing to direct intake and exhaust air away from one another at substantially a ninety degree angle and to effect heat exchange of air directed into the dwelling to minimize heat loss of exhausted air from the dwelling.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view, taken in elevation, of the instant invention in association with a dwelling.

FIG. 4 is an orthographic view, taken along the lines 4—4 of FIG. 3, in the direction indicated by the arrows.

FIG. 5 is an orthographic view, taken along the lines 5—5 of FIG. 3, in the direction indicated by the arrows.

FIG. 6 is an orthographic view, taken in elevation, of modified intake and exhaust conduits utilized by the instant invention.

FIG. 7 is an orthographic view, taken in elevation, of a further modified intake and exhaust conduit arrangement utilized by the instant invention.

FIG. 8 is an orthographic view, taken along the lines 8—8 of FIG. 7, in the direction indicated by the arrows.

FIG. 9 is an orthographic view illustrating the modified intake and exhaust conduits in association with a plenum housing utilized in coordination with the heating and air conditioning duct work of an existing dwelling.

DESCRIPTION OF THE PREFERRED EMBODIMENT

Figure 1:
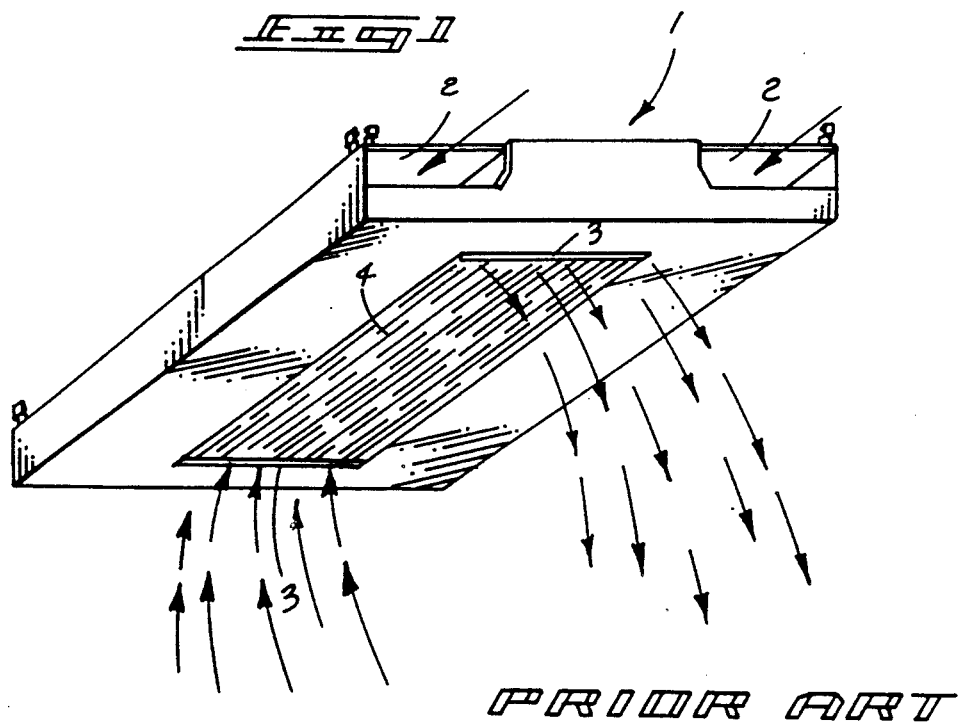
FIG. 1 is an isometric illustration of a prior art ventilation apparatus.

With reference now to the drawings, and in particular to FIGS. 1 to 9 thereof, a new and improved ventilation apparatus embodying the principles and concepts of the present invention and generally designated by the reference numeral 10 will be described.

Figure 2:
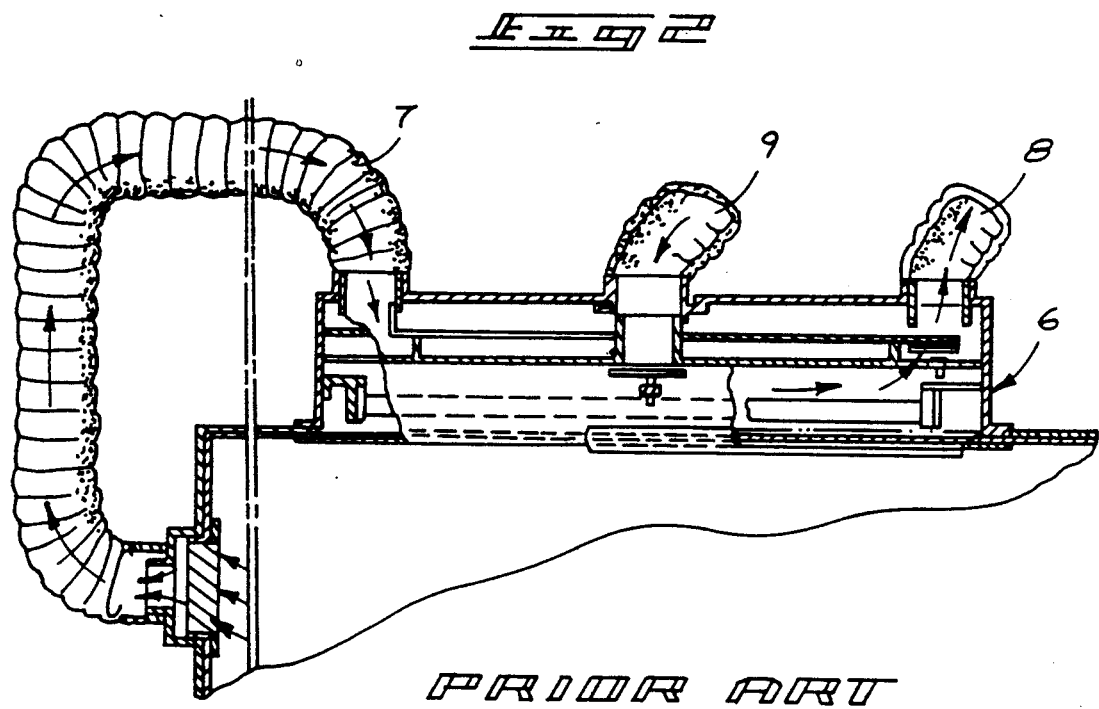
FIG. 2 is an isometric illustration of a further example of a prior art ventilation apparatus.

FIG. 1 illustrates a prior art ventilation apparatus 1, wherein the housing includes a plurality of intake ducts 2 and exhaust ducts 3 mounted in a relationship to a lighting defuser panel to effect cooling of a lighting system arranged therewithin. FIG. 2 similarly illustrates a prior art lighting housing 6, wherein an exhaust duct 7 effects a directional flow of air across the lighting fixture through an exhaust duct 8 to effect cooling of the lighting fixture. FIG. 9 is the use of an intake air conduit in association with the organization.

More specifically, the ventilation apparatus 10 of the instant invention is utilized in association with a dwelling, including a ceiling 11 underlying a roof structure 12. A cylindrical ventilation housing 13 is mounted within a ceiling structure 11 and projects downwardly therefrom to define a convex surface. A central and coaxially positioned light defuser panel 14 is mounted medially of the housing 13, including a lighting bulb 14a mounted coaxially therewithin. An exhaust housing 15 is mounted within the housing 13 occupying substantially one-half of the housing above the defuser panel 14 diametrically opposed within the housing 13 to an intake housing 16. The housing includes semi-annular exhaust grids 17 mounted through a forward face of the exhaust housing 15 diametrically opposed to a semiannular intake grid 18. An exhaust fan 19 is mounted within the exhaust housing 15 coaxially aligned therewith positioned rearwardly of the exhaust grid 17, with an intake fan 20 mounted within the intake housing 16 aligned with and positioned rearwardly of the exhaust grid 18. The exhaust grid 17 is oriented relative to the intake grids 18 at an orientation defining an angle of ninety degrees to minimize turbulence between the intake and exhaust air flow, with the exhaust and intake fans 19 and 20 respectively aligned in the same orientation coaxially mounted within their respective exhaust and intake housings 15 and 16. The right angle 21, as noted, simultaneously minimizes turbulence relative to the intake and exhaust air flow, as well as enhancing distribution of the air flow throughout the room structure containing the ventilation housing 13. A lower exhaust coupling conduit 22 and a lower intake coupling conduit 23 are mounted at upper ends of the respective exhaust and intake housings 15 and 16 for communication respectively with a respective elongate exhaust conduit 24 and an intake conduit 25. As illustrated, the exhaust and intake conduits 24 and 25 respectively are in contiguous heat exchange association relative to one another along a major portion of their extent within a range of substantially seventy to ninety percent of their length. Upper ends of the respective exhaust and intake conduits are mounted to respective upper exhaust and intake coupling conduits 26 and 27. The upper exhaust intake coupling conduits 26 and 27 are in communication with a "T" shaped fixture 28, wherein the "T" shaped fixture includes a "U" shaped exhaust duct 29 and a "U" shaped intake duct 30. The "U" shaped exhaust intake ducts 30 are also maintained in a continuous mounted relationship relative to one another to enhance heat exchange along their extent. The upper ends of the "U" shaped conduits include downwardly directed ports defining downwardly directed exhaust port 29a and a downwardly directed intake port 30a to minimize entrance of debris within the "T" shaped fixture 28. As illustrated in FIG. 3 also, an electrical power transmission line 31 directs electrical power from the dwelling to the light 14a, as well as the exhaust intake fans 19 and 20. FIG. 6 illustrates a modified exhaust intake tube arrangement, wherein the exhaust tube 30 is of a generally longitudinally aligned configuration, while the modified intake tube 33 is in continuous contact about the exhaust tube 32, but is of a spiral or helical winding thereabout to enhance contact surface of the incoming charge of intake air relative to the exhaust air, which is typically at an elevated temperature during periods of wintery or cold weather conditions.

FIG. 7 illustrates a further modified exhaust and intake tubing arrangement, wherein the exhaust tube 34 defines an enlarged diameter relative to the intake tube 35, wherein the intake tube 35 is received within the exhaust tube 34 about a majority of its length, also in the range of seventy to ninety percent.

FIG. 9 illustrates the modified exhaust and intake tubes 32 and 33 mounted within a plenum housing 36. The plenum housing 36 is of a longitudinally aligned elongate configuration, including a bottom end and a top end, wherein the intake and exhaust tubes 32 and 33 enter the plenum housing 36 through a bottom end and are directed outwardly therefrom at its top end, wherein the plenum housing encompasses at least eighty percent of the exhaust and intake tubes' longitudinal extent. A first and second heating and air conditioning conduit 37 and 38 directs air flow into the plenum housing 36, whereupon in conditions of cold or lower temperatures, heated air is directed within the plenum housing 36 to enhance heating of the incoming intake air through the intake conduit 33. During elevated temperatures associated with summer conditions, the plenum housing 36 receives refrigerated air directed through the air conditioning unit of a typical dwelling to minimize elevated air directed within a room containing the ventilation housing 13.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

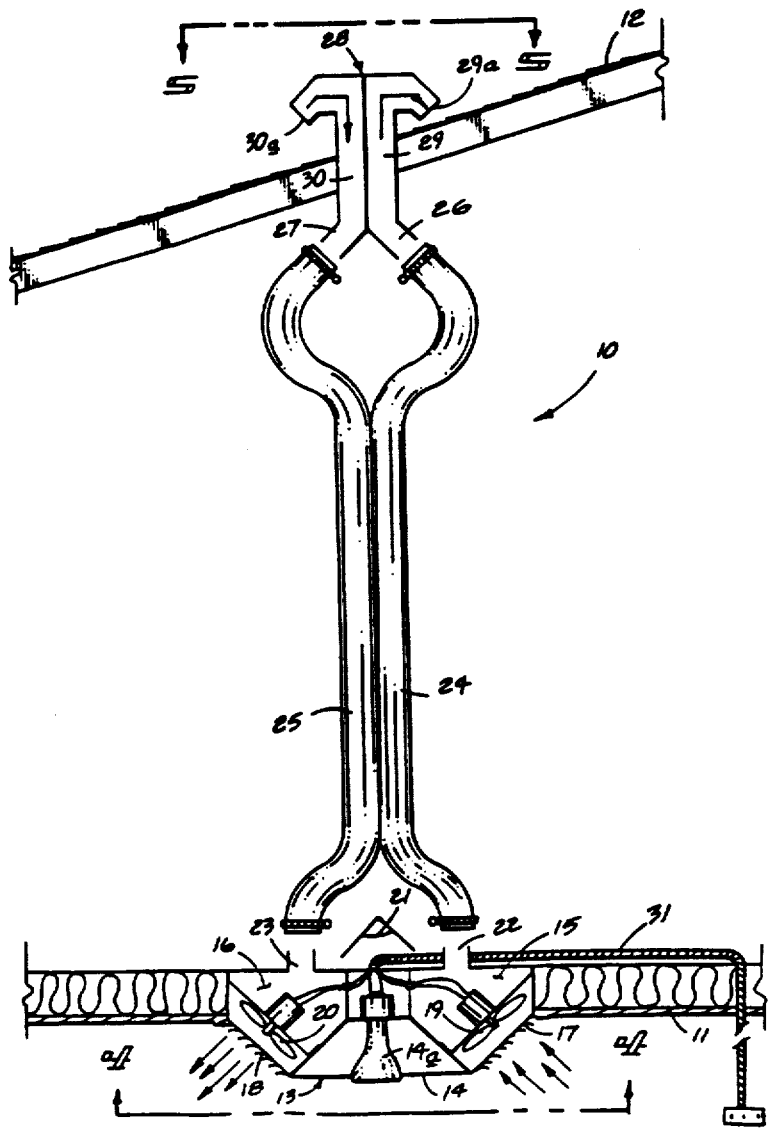

What is claimed as being new and desired to be protected by Letters Patent of the United States is as follows:

1. A ventilation apparatus for mounting within a dwelling, wherein the dwelling includes a ceiling underlying a roof, the apparatus comprising,
   a ventilation housing mounted within the ceiling, the ventilation housing including a convex exterior surface directed exteriorly of the ceiling, and including an intake grid and an exhaust grid, and
   an intake fan mounted within the ventilation housing rearwardly of the intake grid, and
   an exhaust fan mounted within the ventilation housing rearwardly of the exhaust grid, and
   an exhaust conduit and an intake conduit, the exhaust conduit and the intake conduit each including a respective lower terminal end, wherein the lower terminal end of the exhaust conduit is mounted in association with the exhaust fan, wherein the lower terminal end of the intake conduit is mounted in association with the intake fan, and
   a "T" shaped fixture mounted through the roof, the "T" shaped fixture including a "U" shaped exhaust duct and a "U" shaped intake duct, the "U" shaped exhaust duct and the "U" shaped intake duct are mounted in contiguous relationship relative to one another along a vertical extent of each "U" shaped exhaust duct and "U" shaped intake duct, and
   the "U" shaped exhaust duct including a downwardly directed exhaust port and the "U" shaped intake duct including a downwardly directed intake port, and
   a "T" shaped fixture of a generally cylindircal configuration, wherein the "U" shaped exhaust duct and the "U" shaped intake duct are diametrically opposed relative to one another within the "T" shaped fixture, and the downwardly directed exhaust port and the downwardly directed intake port are arranged diametrically opposed relative to one another in alignment with the respective "U" shaped exhaust duct and "U" shaped intake duct, and an upper terminal end of the exhaust conduit is mounted in communication with the "U" shaped exhaust duct and an upper terminal end of the intake conduit is mounted in communication with the "U" shaped intake duct.

2. An apparatus as set forth in claim 1 wherein the ventilation housing is of a cylindrical configuration, and wherein the exhaust grid and the intake grid are diametrically opposed relative to one another, and the exhaust fan and the intake fan are diametrically opposed to one another, and the exhaust grid and the intake grid and the respective exhaust fan and the intake fan define an included angle therebetween of ninety degrees.

3. An apparatus as set forth in claim 2 wherein the ventilation housing includes a coaxially arranged diffuser panel, and a light bulb mounted rearwardly of the diffuser panel and coaxially of the ventilation housing.

4. An apparatus as set forth in claim 3 wherein the exhaust conduit and the intake conduit are in contiguous association relative to one another along a major portion of their extent between the ventilation housing and the "T" shaped fixture.

5. An apparatus as set forth in claim 4 wherein the major portion of their extent defines ninety percent of a defined length of the exhaust conduit and the intake conduit.

6. An apparatus as set forth in claim 5 wherein the intake conduit is helically wound about the exhaust conduit.

7. An apparatus as set forth in claim 6 further including a longitudinally aligned plenum housing, the plenum housing including a lower end surface and a top end surface, and the exhaust conduit and the intake conduit directed through the lower end surface of the plenum housing and contained interiorly of the plenum housing and emerging outwardly of the plenum housing through a top surface of the plenum housing, the plenum housing encompassing seventy to ninety percent of the exhaust conduit and the intake conduit, and a first heating duct directed into the plenum housing, and a second heating duct directed exteriorly of the plenum housing to direct heated air throughout the plenum housing.

* * * * *

UNITED STATES PATENT AND TRADEMARK OFFICE
CERTIFICATE OF CORRECTION

PATENT NO. : 5,000,081　　　　　　　　　　　　　　Page 1 of 2

DATED : March 19, 1991

INVENTOR(S) : Robert S. Gilmer

It is certified that error appears in the above-identified patent and that said Letters Patent is hereby corrected as shown below:

The Title Page should be deleted to appear as per attached title page.

Signed and Sealed this

Twenty-seventh Day of October, 1992

*Attest:*

DOUGLAS B. COMER

*Attesting Officer*　　　*Acting Commissioner of Patents and Trademarks*

United States Patent [19]

Gilmer

[11] Patent Number: 5,000,081
[45] Date of Patent: Mar. 19, 1991

[54] VENTILATION APPARATUS

[76] Inventor: Robert S. Gilmer, 328 Innsbruck Ct., Santa Rosa, Calif. 95401

[21] Appl. No.: 512,334

[22] Filed: Apr. 23, 1990

[51] Int. Cl.⁵ ............................................. F24F 7/08
[52] U.S. Cl. ................................... 98/35; 165/54
[58] Field of Search ................. 98/33.1, 35, 40.07, 98/62; 165/54, 909

[56] References Cited

U.S. PATENT DOCUMENTS

| | | | |
|---|---|---|---|
| 1,529,711 | 3/1925 | Parrott et al. | 98/33.1 |
| 3,791,279 | 2/1974 | Holt et al. | 98/35 X |
| 4,336,748 | 6/1982 | Martin et al. | 98/35 X |
| 4,846,261 | 7/1989 | Kittilä | 98/33.1 X |

FOREIGN PATENT DOCUMENTS

| | | | |
|---|---|---|---|
| 29573 | 6/1981 | European Pat. Off. | 165/54 |
| 238631 | 11/1985 | Japan | 98/33.1 |

Primary Examiner—Harold Joyce
Attorney, Agent, or Firm—Leon Gilden

[57] ABSTRACT

An apparatus including a ventilation conduit mounted within a ceiling structure of a dwelling, with an exhaust fan and intake fan arranged at ninety degrees relative to one another, with an intake pipe and exhaust pipe arranged contiguously about their major extent relative to one another to effect heat exchange minimizing cold air entering the dwelling.

7 Claims, 5 Drawing Sheets